United States Patent
Feng et al.

(10) Patent No.: US 8,418,197 B2
(45) Date of Patent: Apr. 9, 2013

(54) METHOD AND APPARATUS FOR BROWSER BASED ADVERTISEMENT INSERTION

(75) Inventors: Xin Feng, Basking Ridge, NJ (US); Srinivasa Dharmaji, Cupertino, CA (US)

(73) Assignee: Goldspot Media, Sunnyvale, CA (US)

( * ) Notice: Subject to any disclaimer, the term of this patent is extended or adjusted under 35 U.S.C. 154(b) by 336 days.

(21) Appl. No.: 12/582,573

(22) Filed: Oct. 20, 2009

(65) Prior Publication Data
US 2010/0107191 A1    Apr. 29, 2010

Related U.S. Application Data

(60) Provisional application No. 61/197,749, filed on Oct. 29, 2008.

(51) Int. Cl.
*H04N 7/10*        (2006.01)
(52) U.S. Cl.
USPC .................................. 725/32; 725/34; 725/35
(58) Field of Classification Search .......................... None
See application file for complete search history.

(56) References Cited

U.S. PATENT DOCUMENTS

| | | | |
|---|---|---|---|
| 5,155,591 A | 10/1992 | Wachob | |
| 5,319,455 A | 6/1994 | Hoarty et al. | |
| 5,335,277 A * | 8/1994 | Harvey et al. | 380/242 |
| 5,874,986 A | 2/1999 | Gibbon et al. | |
| 6,446,261 B1 | 9/2002 | Rosser | |
| 6,834,195 B2 | 12/2004 | Brandenberg et al. | |
| 6,977,667 B1 | 12/2005 | Burke | |
| 7,103,904 B1 | 9/2006 | Blackketter et al. | |
| 7,788,398 B2 * | 8/2010 | Chapweske et al. | 709/233 |
| 7,895,629 B1 * | 2/2011 | Shen et al. | 725/62 |
| 2002/0019831 A1 | 2/2002 | Wade | |
| 2002/0026636 A1 | 2/2002 | LeComte | |
| 2002/0073235 A1 | 6/2002 | Chen et al. | |
| 2004/0034874 A1 | 2/2004 | Hord et al. | |
| 2004/0068746 A1 | 4/2004 | Mori et al. | |
| 2004/0207761 A1 | 10/2004 | Paik et al. | |

(Continued)

FOREIGN PATENT DOCUMENTS
JP    2001-128139    5/2001

OTHER PUBLICATIONS

International Search Report and Written Opinion mailed Oct. 4, 2010 in related PCT patent application No. PCT/US10/45205, 12 pages.

(Continued)

*Primary Examiner* — Brian Pendleton
*Assistant Examiner* — Jason K Lin
(74) *Attorney, Agent, or Firm* — Michael A. Glenn; Glenn Patent Group

(57) ABSTRACT

Content is downloaded to a mobile handheld device (MHD) and buffered on the MHD prior to, and during, viewing. Normal wireless bandwidth varies with atmospheric conditions, distance, obstructions in the path, etc. and hence the speed at which a content-buffer (CB) on the MHD is replenished changes. Because this can result in very low quality viewing experience for the user, the capability for alternate content scheduling provided a micro-splicer is used to enable stored alternate-content or advertisement insertion during periods of low viewing quality, when the CB does not hold sufficient content during the viewing period. This alternate content insertion allows the CB to be refilled before the user resumes content viewing.

3 Claims, 3 Drawing Sheets

U.S. PATENT DOCUMENTS

| | | |
|---|---|---|
| 2005/0028200 A1* | 2/2005 | Sardera .............. 725/42 |
| 2005/0210504 A1* | 9/2005 | Ko et al. ............. 725/40 |
| 2005/0245241 A1 | 11/2005 | Durand et al. |
| 2006/0194601 A1* | 8/2006 | Nandagopalan .............. 455/515 |
| 2006/0212897 A1 | 9/2006 | Li et al. |
| 2007/0083886 A1* | 4/2007 | Kauffman et al. ............. 725/34 |
| 2007/0107036 A1* | 5/2007 | Chen et al. .............. 725/135 |
| 2008/0040743 A1 | 2/2008 | Dharmaji |
| 2008/0098420 A1* | 4/2008 | Khivesara et al. .............. 725/32 |
| 2008/0134018 A1 | 6/2008 | Kembel et al. |
| 2008/0192736 A1 | 8/2008 | Jabri et al. |
| 2008/0195664 A1 | 8/2008 | Maharajh et al. |
| 2008/0201225 A1 | 8/2008 | Maharajh et al. |
| 2008/0207137 A1 | 8/2008 | Maharajh et al. |
| 2008/0271069 A1* | 10/2008 | Kim et al. ............. 725/32 |
| 2009/0240568 A1 | 9/2009 | Ramer et al. |
| 2009/0260028 A1* | 10/2009 | Dunn et al. ............. 725/20 |
| 2009/0287841 A1* | 11/2009 | Chapweske et al. .......... 709/231 |
| 2010/0333129 A1 | 12/2010 | Alhadeff et al. |

OTHER PUBLICATIONS

International Search Report and Written Opinion mailed Dec. 18, 2009 in related PCT patent application No. PCT/US2009/061466, 11 pages.

HTML5 Draft standard updated Jun. 24, 2010 available from the website at http://whatwg.org/html5, Abstract and Table of Contents, 15 pages.

* cited by examiner

METHOD AND APPARATUS FOR BROWSER BASED ADVERTISEMENT INSERTION

CROSS REFERENCE TO RELATED APPLICATIONS

This application claims priority to U.S. provisional patent application Ser. No. 61/197,749, Browser Based Advertisement insertion, filed 29 Oct. 2008, which application is incorporated herein in its entirety by this reference thereto.

BACKGROUND OF THE INVENTION

1. Technical Field

The invention relates to displaying content and advertisements on mobile hand-held devices. More particularly, the invention relates to improving the quality of the user experience during content viewing in connection with bandwidth-limited transmission of data.

2. Description of the Background Art

Content viewing on mobile handheld devices (MHDs) is beginning to become popular. However, in most cases the quality of the viewed image is fuzzy and intermittent due to the variable nature of the bandwidth that is available to connect the MHD to the source or transmitter of content. The volume of data to be viewed as content prevents the pre-downloading and storing of data on the MHD to improve this situation.

Alternate content, including advertisements, to be viewed with the content, on the other hand is typically downloaded and stored on the MHD and inserted at predefined advertisement spots (ad spots) during content viewing by a micro-splicer residing on the MHD. The features and operation of a typical micro-splicer is explained in detail in the co-pending U.S. patent application Ser. No. 11/828,204, Micro-splicer for Inserting Alternate Content to a Content Stream on a Handheld device, filed 25 Jul. 2007, assigned to common assignee, which application is incorporated herein in its entirety by the reference thereto. The content for viewing is hence buffered on the MHD as the user of the MHD enables the viewing process.

The rendering of the content for viewing typically starts only when the buffer crosses a threshold of fill. This is done to provide the user with a reasonable level of quality of viewing experience. Once the rendering and viewing starts, depending on the bandwidth available for the content down load, the buffer is replenished or depleted. When the buffer on the MHD is depleted, the viewing experience degrades. This is because there is no time to retrieve dropped packets and enable full frame displays to retain the viewing quality. Hence, with a depleted buffer on the MHD the user sees fuzzy and partial frames which result in a very low quality viewing experience.

It would therefore be advantageous to provide a way of improving the viewing quality by allowing the buffer on the MHD to be replenished while the user of the MHD is able to watch full frames of information, even in a low bandwidth availability situation.

SUMMARY OF THE INVENTION

Content is downloaded and buffered on a mobile hand held device (MHD) 100 prior to and during viewing to provide a good viewing experience. Normal wireless bandwidth varies with atmospheric conditions, distance, obstructions in the path, etc. and, hence, the speed at which a content-buffer (CB) on the MHD is replenished changes. This can result in very low quality viewing experience for the user. Therefore, the capability of a micro-splicer for alternate content scheduling is used to enable stored alternate-content or advertisements to be buffered for insertion during periods of low viewing quality, when the CB does not hold sufficient content during the viewing period. This buffered alternate content insertion allows the CB on the MHD to be refilled before resuming the content viewing, thereby improving the quality of viewing experience on the MHD.

DETAILED DESCRIPTION OF THE INVENTION

Figure 1:
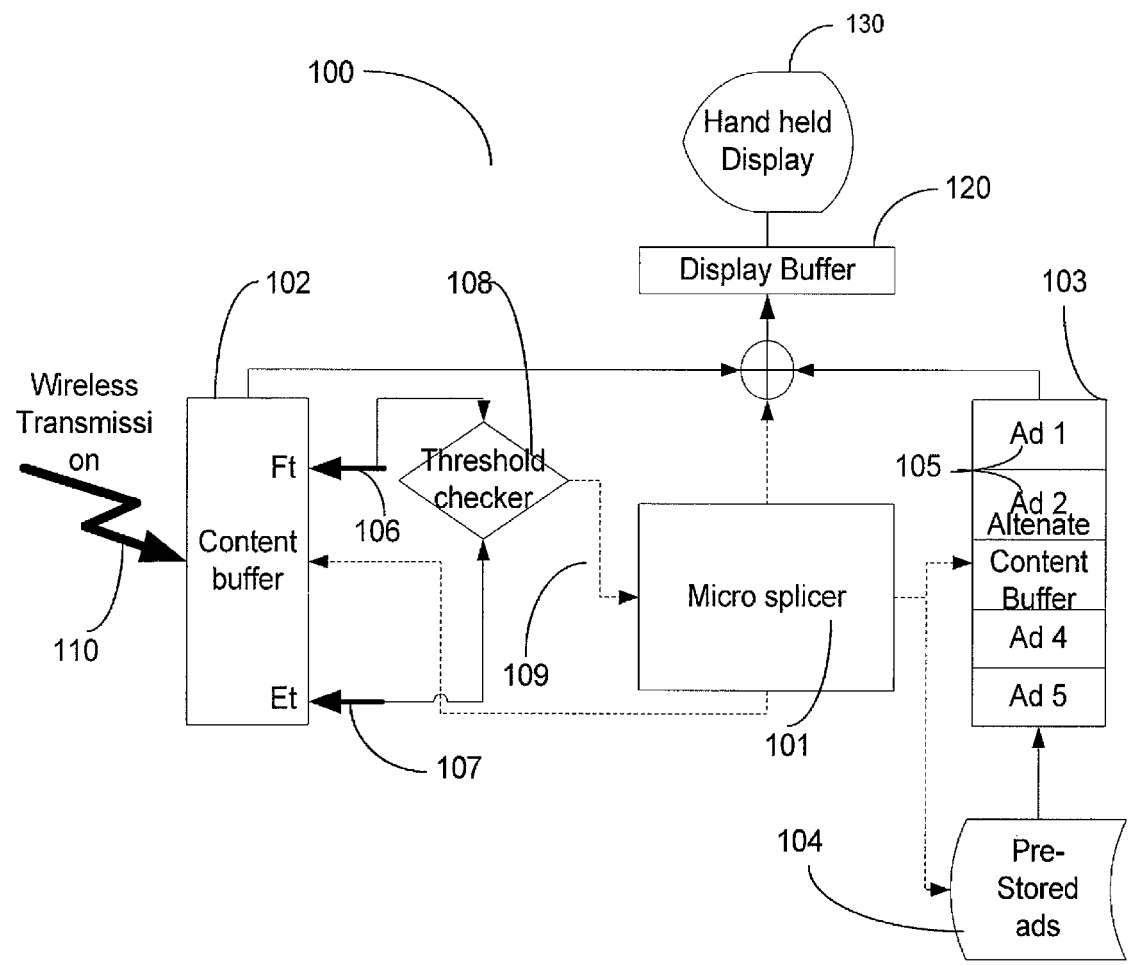
FIG. 1 is a block schematic diagram showing a system for insertion of content or alternate content into a content stream based on thresholds set in a content buffer according to the invention.

When digital content is received and displayed on a mobile handheld device (MHD), the content is transferred from the content source to the MHD via a wireless medium. To provide a good viewing experience to the user, the content is downloaded and buffered on the MHD prior to, and during, viewing. Normal wireless bandwidth varies with atmospheric conditions, distance, obstructions in the path, etc. and, hence, the speed at which a content-buffer (CB) on the MHD is replenished changes. This can result in very low quality viewing experience for the user. Therefore, the capability of a micro-splicer for alternate content scheduling is used to enable stored alternate-content or advertisement insertion during periods of low viewing quality, when the CB does not hold sufficient content during the viewing period. This alternate content insertion allows the CB to be refilled before the user resumes content viewing, thereby improving the quality of user viewing experience on the MHD.

An embodiment of the invention improves the user viewing experience on an MHD, where poor bandwidth availability affects data reception speed and viewing quality. As noted above, the MHD downloads video content and stores it in a content buffer (CB) memory prior to, and during, user content viewing. The quantum of data is limited by the MHD's memory capacity, and continuous replenishment of the CB is accomplished through downloading of data. Shrinking bandwidth in the wireless transmission reduces the speed at which the CB is replenished. This can result in an inadequate amount of data in buffer for content display, which produces incomplete frames due to dropped packets which could not be recovered in time. This can result in a lower number of frames per second and a very low quality viewing experience for the user. By using the capabilities of a micro-splicer to enable stored alternate-content or advertisement insertion during periods of low viewing quality, the limitations introduced in the CB due to low availability of bandwidth are overcome. This alternate content insertion allows the CB to be refilled before the user resumes content viewing. Alternate content or advertisements are used to cover the low quality viewing period. Hence, an improvement in the quality of user viewing experience on the MHD is achieved.

An embodiment of the invention allows continuous viewing of frames of information that is either pooled from the CB, which is being replenished continuously, or from a second or alternate content buffer (ACB). The ACB may contain downloaded, pre-stored alternate content, for example, advertisements. The downloaded and pre-stored alternate content may be stored in a separate storage unit linked to the ACB for fast replenishment of the ACB when the advertisements are being displayed. The choice of which stream of data to view, and from which buffer, is defined by the fill and empty thresholds or set levels of the CB. That data stream is transferred to a display buffer from the CB or ACB, based on the decision for rendering and display on the MHD.

In a presently preferred embodiment of the invention, the micro-splicer has two types of content buffer: an ACB which holds an alternate stream of data, e.g. advertisements; and the CB which contains a current viewing data stream to choose from. The choice of data stream to be viewed at any instant is based on thresholds for fill and empty, set on the CB. A threshold checker is used to monitor the fill status of the CB. This status information is supplied to the micro-splicer from the time the user that the MHD enables viewing. Based on the fill status, the micro-splicer decides which available buffer, i.e. the CB or the ACB, is to be the current buffer for loading content into the display buffer for viewing. The system then allows streams of data from that current buffer to be used to fill the display buffer and, therefore, be used for viewing on the MHD.

Figure 2:
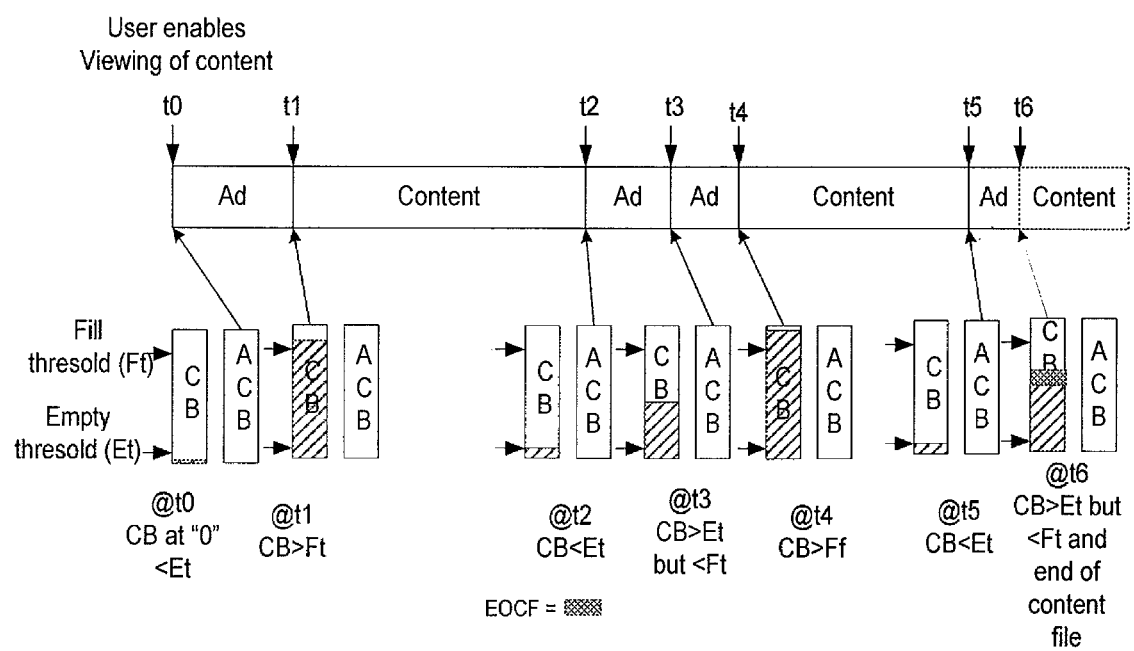
FIG. 2 is a block schematic diagram showing a sequence of insertion of alternate content and content into the display buffer for viewing based on the thresholds set in the content buffer according to the invention.

When the CB has a fill value that is below the set empty threshold, the micro-splicer enables the content from ACB to be viewed on MHD. Once the CB fill value crosses the set fill threshold, and the alternate content that is being viewed is completed, the micro-splicer switches back to the CB for viewing of content on the MHD. By monitoring and inserting alternate content during the period when the CB has less than a amount of sufficient content for providing a quality viewing experience, the micro-splicer allows the CB to be refilled. If, during filling time, the end of the content file is reached, the micro-splicer loads the content file at the end of advertisement file that is being displayed, even if fill threshold value for the CB has not been reached. This enables content viewing to be completed without further interruption and enables the micro-splicer to provide an improved viewing experience on MHD FIG. 1 is a block schematic diagram of a system 100 for browser based advertisement insertion according to the invention. FIG. 2 is a block schematic diagram showing the insertion of content from the CB 102 and alternate content from the ACB 103, into the display buffer 120, for display in accordance with the system shown in FIG. 1. In FIG. 1, a micro-splicer 101 is shown that is capable of acting as a content scheduler, and also as an alternate content scheduler. The micro-splicer is used to control the loading of content received via wireless link 110 into the CB 102, or to control the loading of advertisements 105 transferred from the store 104 into the ACB 103 into the display buffer 120. Typically, whatever is in the display buffer 120 is displayed on the handheld display 230. A threshold checker 108 continuously monitors the status of the CB 102. The threshold checker monitors the fill threshold (ft) 106 and the empty threshold (et) 107 of the CB 102, as well as the presence of an end-of-content-file (EOCF) data block in the CB 102, and provides control information to the micro-splicer. The control information is sent to the micro-splicer 101 by means of a control output link 109 from the threshold checker 108.

When a user enables viewing of content stream over the wireless link 110, the CB starts at a value below Et, as shown at time t0 in FIG. 2. This control information is sent to the micro-splicer by the threshold checker 108 via the control output link 109. Based upon the input received, the micro-splicer enables the ACB 103 to load and display an advertisement (ad) 105 that was already transferred into the ACB 103 from the pre-stored ads in the storage 104. At time t1, upon completion of the advertisement or advertisements being displayed, the CB 102 has a filled buffer with buffer level greater than the Ft 106. In response to this, the micro-splicer starts loading the content from the CB 102 into the display buffer 120, thus enabling viewing of the content on the handheld display 130. The CB 102 continues to be filled by content received from the input via the wireless connection 110 during content viewing. This allows the micro-splicer 101 to keep loading the display buffer from CB 102, thus enabling continued viewing of the content by the user. If, due to any drop in bandwidth, the filling of the CB 102 slows down and the content in CB 102 falls below Et 107, then the threshold checker provides a control signal on the control output link 109 to micro-splicer 101. Based upon the control signal, the micro-splicer 101 stops the content loading into the display buffer 120 and loads the next alternate content or advertisements 105 from the ACB 103, as shown at time t2 in FIG. 2. The number of advertisements displayed is based on the time it takes for the CB to be refilled to a value over Ft 106, as shown at time t3 in FIG. 2. When the CB 102 is filled to a value over Ft 106, the threshold checker 108 provides a control signal on the control output link 109 to the micro-splicer to stop the loading of the advertisements from ACB 103 and start loading the content from the CB 102. This process repeats, based upon the control signals from the threshold checker 108, until the content viewing on the MHD is switched off.

If, during the fill time of the CB while advertisements from ACB are being displayed the EOCF is identified by the threshold checker 108, then a control signal on the control output link 109 intimates this to the micro-splicer 101. In response to the control input received, the micro-splicer starts loading the content from the CB 102 into the display buffer 120 at the end of the advertisement currently being displayed to the EOCF. This allows the completion of the content viewing by the user, even though the value of content in CB 102 has not reached Ft 106.

By enabling the CB 102 to be filled to a reasonable value before starting display of content, and allowing the CB to be refilled if depleted without degrading the quality of display, the disclosed method improves the quality of the viewing experience for the MHD user. By inserting advertisements to cover the gaps in display during the periods when the CB 102 is depleted and filling, the continuity of the viewing experience is maintained.

Figure 3:
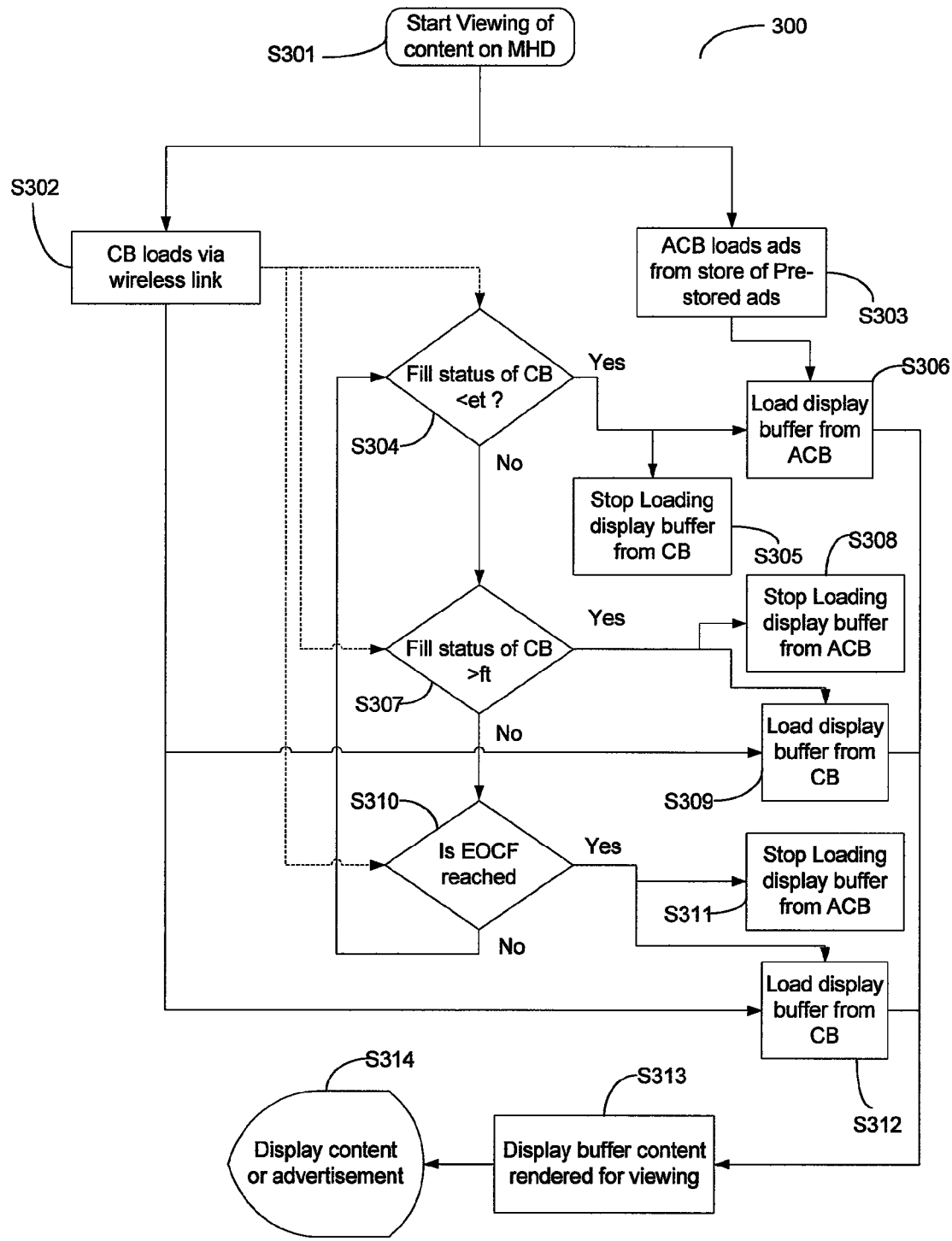
FIG. 3 is a flow chart showing a process for improving the quality of a user content viewing experience on a mobile hand held device (MHD) according to the invention.

FIG. 3 is a flowchart showing a process 300 for improving the viewing quality on the MHD according to the invention. The user initiates viewing of the content on the MHD at the start of the process (S301). Immediately, the CB starts loading content from the wireless link (S302). Simultaneously, advertisements are loaded into the ACB from the storage containing pre-downloaded advertisements (S303). A threshold checker continuously checks the fill status of the CB. If the CB fill status is below the threshold value Et (S304), as it is at start of viewing, the micro-splicer stops loading the display buffer from the CB (S305) and starts loading the display buffer from the ACB (S306) with alternate content, e.g. advertisements. The CB is monitored to detect when the fill status reaches the threshold Ft (S307). When it reaches the threshold Ft, the micro-splicer stops the loading of the display buffer from the ACB (S308) at the end of the currently loading advertisement and begins loading the display buffer from the CB (S309). The threshold checker also checks for the EOCF in the CB. If, at any time, the EOCF is recognized (S310) while the display buffer is being loaded from the ACB, the micro-splicer stops loading of the display buffer from the ACB (S311) and starts loading the display buffer from the CB (S312) after the completion of the current advertisement. The display buffer loading is continued to the EOCF. Any content loaded into the display buffer is rendered and sent to the display screen (S313) and displayed on the screen (S314).

The exemplary embodiment of the invention for improving the quality of viewing experience on the MHD for the user described herein is not meant to be limiting in any way. Certain elements of the invention may be implemented in hardware, software, firmware, or any combination thereof. For example, when the invention, or portions thereof, is implemented in software, a sequence of instructions is provided on a tangible medium accessible by a computer or a computing capable device, such that when the sequence of the instructions are executed on the computer or the computing devices the invention taught herein is realized.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A mobile handheld device, comprising:
a display;
a display buffer coupled to said display;
a first content buffer for buffering a received content stream, said content buffer coupled to said display buffer via a switch;
a second content buffer for buffering an alternate content stream for display on said display, said second content buffer coupled to said display buffer via said switch;
a storage unit having stored therein preloaded content, said storage unit coupled to said second content buffer;
a threshold checker for checking a fill and an empty status of said first content buffer, for identifying an end-of-content-file, and for outputting a control signal responsive thereof to operate a micro-splicer; and
a micro-splicer coupled to said first content buffer, said second content buffer, said storage unit, and said switch, said micro-splicer configured to operate said switch in response to said control signal to provide alternate content from said second content buffer to said display buffer when said first content buffer has insufficient content to ensure good quality display on said handheld display;
wherein viewing quality on the mobile handheld device is improved;
wherein said micro-splicer is configured to load said second content buffer from said storage unit at the same time that advertisements are loaded into said display buffer from said second content buffer, thereby emptying said second content buffer.

2. A method for improving the viewing quality on a mobile handheld device (MHD), comprising the steps of:
a user initiating viewing of content on said MHD;
a content buffer (CB) starting to load content into a display buffer of said MHD from a wireless link;
simultaneously loading alternate content into an alternate content buffer (ACB) from a storage containing pre-downloaded alternate content;
a threshold checker continuously checking a fill status of the CB, said threshold checker outputting a control signal responsive thereof to operate a micro-splicer;
wherein, if the control signal from the threshold checker indicates that the CB fill status is below a threshold value Et, the micro-splicer stops loading the display buffer from the CB and starts loading the display buffer from the ACB with alternate content;
said threshold checker monitoring the CB to detect when the CB fill status reaches the threshold value Ft;
when the CB fill status reaches the threshold Ft, the control signal from the threshold checker is sent to the micro-splicer, stopping the loading of the display buffer from the ACB at the end of a currently loading advertisement and beginning loading of the display buffer from the CB;
the threshold checker checking for an-of-content-file EOCF data block in the CB;
wherein, if at any time the EOCF is recognized while the display buffer is being loaded from the ACB, the control signal from the threshold checker is sent to the micro-splicer, which stops loading of the display buffer from the ACB and starts loading the display buffer from the CB after the completion of a current advertisement;
continuing loading the display buffer until the EOCF is recognized:
rendering any content loaded into the display buffer and sending said rendered content to a display screen for display;
wherein said micro-splicer is configured to load said alternate content buffer from said storage at the same time that advertisements are loaded into said display buffer from said alternate content buffer, thereby emptying said alternate content buffer.

3. An apparatus for improving the viewing quality on a mobile handheld device (MHD), comprising:
a content buffer (CB) configured for starting to load content into a display buffer of said MHD from a wireless link upon a user initiating viewing of content on said MHD;
an alternate content buffer (ACB) into which alternate content is simultaneously loaded from a storage containing pre-downloaded alternate content;
a threshold checker for continuously checking a fill status of the CB, the threshold checker further configured for checking for an end-of-content-file EOCF data block in the CB, said threshold checker outputting a control signal responsive thereof to operate a micro-splicer; and
a micro-splicer, responsive to the control signal from the threshold checker, configured to stop loading the display buffer from the CB and start loading the display buffer from the ACB with alternate content if the CB fill status is below a threshold value Et, the micro-splicer configured for monitoring the CB to detect when the CB fill status, as determined by the threshold checker, reaches the threshold value Ft, the micro-splicer configured for stopping loading of the display buffer from the ACB at the end of a currently loading advertisement and beginning loading of the display buffer from the CB when the CB fill status, as determined by the threshold checker, reaches the threshold Ft, the micro-splicer configured to stop loading of the display buffer from the ACB and start loading the display buffer from the CB after the completion of a current advertisement if at any time the EOCF is recognized by the threshold checker while the display buffer is being loaded from the ACB, the micro-splicer configured to continue loading the display buffer until the EOCF is recognized by the threshold checker;

wherein any content loaded into the display buffer is rendered and sent to a display screen for display;

wherein said micro-splicer is configured to load said alternate content buffer from said storage at the same time that advertisements are loaded into said display buffer from said alternate content buffer, thereby emptying said alternate content buffer.

\* \* \* \* \*